United States Patent
Cermak, III et al.

(10) Patent No.: US 6,726,505 B2
(45) Date of Patent: Apr. 27, 2004

(54) MEMORY DAUGHTER CARD APPARATUS, CONFIGURATIONS, AND METHODS

(75) Inventors: Stephen Cermak, III, Elk Mound, WI (US); Jeffrey S. Conger, Eau Claire, WI (US); David Paul Gruber, Mondovi, WI (US); Thomas Alex Crapisi, Jim Falls, WI (US); Stephen A. Bowen, Chippewa Falls, WI (US); Steven Shafer, Eau Claire, WI (US); Mark Ronald Sikkink, Chippewa Falls, WI (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 10/231,511

(22) Filed: Aug. 29, 2002

(65) Prior Publication Data

US 2003/0077925 A1 Apr. 24, 2003

Related U.S. Application Data

(63) Continuation of application No. 09/620,178, filed on Jul. 20, 2000, now abandoned.

(51) Int. Cl.$^7$ ............................................. H01R 13/60
(52) U.S. Cl. .................................. 439/567; 174/138 D
(58) Field of Search ................................. 439/567, 571, 439/564; 24/453; 174/138 D

(56) References Cited

U.S. PATENT DOCUMENTS

| | | | |
|---|---|---|---|
| 2,969,521 A | 1/1961 | Scoville | 339/220 |
| 3,097,032 A | 7/1963 | Hochheiser | 339/17 |
| 3,212,049 A | 10/1965 | Mittler et al. | 339/18 |
| 3,867,759 A | 2/1975 | Siefker | 29/628 |
| 4,200,900 A * | 4/1980 | McGeorge | 361/803 |
| 4,760,495 A | 7/1988 | Till | 361/412 |
| 4,786,225 A * | 11/1988 | Poe et al. | 411/32 |
| 4,813,128 A | 3/1989 | Massopust | 29/830 |
| 4,950,170 A | 8/1990 | Miller, Jr. | 439/74 |
| 4,969,065 A * | 11/1990 | Petri | 361/804 |
| 4,970,761 A * | 11/1990 | Nakamura | 24/453 |
| 5,018,982 A | 5/1991 | Speraw et al. | 439/74 |
| 5,152,696 A | 10/1992 | Krajewski et al. | 439/75 |
| 5,176,526 A | 1/1993 | Hillbish et al. | 439/108 |
| 5,281,149 A | 1/1994 | Petri | 439/66 |
| 5,426,563 A | 6/1995 | Moresco et al. | 361/689 |
| 5,452,184 A | 9/1995 | Scholder et al. | 361/799 |

(List continued on next page.)

*Primary Examiner*—Hae Moon Hyeon
(74) *Attorney, Agent, or Firm*—Schwegman, Lundberg, Woessner & Kluth, P.A.

(57) ABSTRACT

New methods and configurations are provided that allow for a large memory capacity, as well as minimized interconnect distances between the memory chips and one or more processors, and the HUB chip-set. The apparatus, configurations and methods include providing a printed circuit board having one or more processor conductive portions and one or more z-axis connector conductive portions in close proximity with each other, and connecting the one or more processors on one side of a printed circuit board, and connecting the one or more z-axis connectors for the memory daughter cards on the opposite side of the processor board. Standoffs are used to support and secure the horizontally disposed z-axis memory daughter cards and to ensure proper spacing between the z-axis daughter cards and the processor board Standoffs include an alignment pin portion and a spacer portion. The alignment pin portion includes an alignment portion, foot, and urging portion. The spacer portion includes pin coupler, relief portion, and aperture. The standoff is inserted into an aperture of a first printed circuit board and turned 90 degrees to secure the spacer portion and the foot to the first printed circuit board. An aperture in a second printed circuit board is slid over the alignment pin portion, wherein the second printed circuit board rests on the spacer portion. The fastening means is used through an aperture in the second printed circuit board communicating with the spacer portion.

10 Claims, 8 Drawing Sheets

U.S. PATENT DOCUMENTS

| | | | |
|---|---|---|---|
| 5,525,763 A | 6/1996 | Van Liere | 174/263 |
| 5,544,017 A | 8/1996 | Beilin et al. | 361/790 |
| 5,575,686 A | 11/1996 | Noschese | 439/620 |
| 5,583,749 A | 12/1996 | Tredennick et al. | 361/790 |
| 5,707,242 A | 1/1998 | Mitra et al. | 439/74 |
| 5,754,412 A * | 5/1998 | Clavin | 361/804 |
| 5,825,630 A | 10/1998 | Taylor et al. | 361/790 |
| 5,954,522 A | 9/1999 | Ho et al. | 439/79 |
| 5,963,432 A | 10/1999 | Crowley | 361/804 |
| 5,963,464 A | 10/1999 | Dell et al. | 365/52 |
| 6,049,465 A | 4/2000 | Blish et al. | 361/767 |
| 6,049,467 A | 4/2000 | Tamarkin et al. | 361/790 |
| 6,084,182 A | 7/2000 | Rehlander | 174/250 |
| 6,086,418 A * | 7/2000 | Chang | 439/573 |
| 6,109,929 A | 8/2000 | Jasper | 439/74 |
| 6,243,272 B1 | 6/2001 | Zeng et al. | 361/760 |
| 6,262,890 B1 | 7/2001 | Dhawan et al. | 361/690 |

* cited by examiner

MEMORY DAUGHTER CARD APPARATUS, CONFIGURATIONS, AND METHODS

CLAIM OF PRIORITY

This application is a continuation under 37 CFR 1.53(b) of U.S. application Ser. No. 09/620,178, filed Jul. 20, 2000 now abandoned, which application is incorporated herein by reference.

CROSS-REFERENCES TO RELATED INVENTIONS

The present invention is related to the following application, which is incorporated herein by reference:

U.S. patent application Ser. No. 09/620,059, filed Jul. 20, 2000, titled "PRINTED CIRCUIT BOARD COMPONENT PACKAGING".

TECHNICAL FIELD OF THE INVENTION

The present invention relates generally to the field of printed circuit boards, and, more particularly, to apparatus and methods for interconnecting stacked circuit boards and component layout on printed circuit boards.

BACKGROUND

Modern high performance computers contain a number of printed circuit boards (PCB) to carry and interconnect the various integrated circuit chips and other components that make up the computer system. Computers may be configured to have one or more subsystems, each in its own right a computer, that are interconnected into a larger, greater capacity computer. Each subsystem may contain basically the same components assembled in a chassis. Within a given subsystem, there may be, among others, a processor board, a power board, and any number of secondary or daughter boards that are carried upon a support structure within the subsystem chassis. These subsystems of boards are carried in racks in the computer chassis.

Processor boards are so named as they contain one or more processors, or central processing units (CPU) The CPU is an integrated circuit (IC) chip that is considered the "brains" of the computer. The processor board serves as a communication medium for the exchange of electrical signals among the one or more attached processors and other electrical components attached to the processor board. The processor board is sometimes referred to as a backplane, mother board, system board, or mainboard, depending on its function and configuration.

The processor board is a printed circuit board having one or more processors attached. A PCB is a relatively thin flat sheet structure. A PCB may be made of laminations of reinforced fiberglass or plastic and metallic interconnects which electrically link the components attached to the board. Since the interconnection level for the attached components is planar, the PCB is said to define an x-y interconnection plane.

The new generation of large processors take up considerable surface area of the processor board to which they are attached. In some cases, components which are typically attached to the PCB are moved to other locations on the board or moved entirely off the board onto daughter boards to make room for the processors. This disadvantage is compounded with the desire to put multiple processors onto one processor board. As a consequence, the distances between electrical components become large which is detrimental to the performance of the system as a whole.

Another electronic component attached to the processor board is an IC chip-set commonly known as the HUB. The HUB controls the computer's electrical components such as, among others, the one or more processors, the memory, and the communication between other PCBs and external peripherals. In the recent past, processor board configurations provided for one processor controlled by one HUB. In order to increase the performance of a computer, designers have added additional processors on a single processor board creating multiple processor boards. A limitation to a computer's performance, among others, is caused by the distance between electrical components, and in particular, the distance between the HUB and the one or more processors. As these distances become greater, the performance of the computer is compromised.

Computer memory chips are one of the critical components which are commonly attached to the processor board in order to be in close proximity to the HUB and the one or more processors. Close proximity is crucial as the time it takes for the HUB to communicate with the memory directly effects the performance of the system as a whole. This configuration is particularly crucial in very high speed supercomputer applications.

Due to the lack of physical surface area on the processor board after the attachment of the newer, larger processors, the memory chips must be moved to other locations on the board which increases the distance between the memory chips and the processors. Additionally, restricting the placement of the memory chips to the processor board would result in a limited number of chips that can physically be attached to a processor board of a certain size. This is unacceptable for computer systems requiring a large memory. As an alternative, the memory may be moved entirely off the board onto daughter cards. As a consequence, the distances between electrical components become large which is detrimental to the performance of the system as a whole.

Daughter cards are printed circuit boards which contain electronic components. Daughter cards are commonly configured to perform one of a number of specialized tasks, such as, among others, provide memory or display functions. Memory cards are daughter cards which contain a plurality of memory IC chips. Daughter cards are attached to the processor board in a number of ways. One popular method of attaching daughter cards to the processor board is by way of an edge connector. A daughter card configured to be used with an edge connector has electrical contacts along one edge of the PCB. The edge with the contacts is inserted into an edge connector socket attached to the processor board. Edge-connected daughter cards are commonly anchored along one edge by the edge connector itself and by a anchoring a second edge to the rack frame or chassis. Edge connectors generally require that the daughter cards be placed perpendicular to the processor board which adds to the overall dimensions of the computer. In an effort to make a smaller form factor computer chassis, this type of memory card configuration is unacceptable.

A high density interconnect configuration that has been utilized in the PCB art is a horizontal stacking of PCBs which are electrically interconnected with z-axis interboard connectors. This stacking and interconnection is referred to at z-axis interconnection. This three-dimensional packing scheme creates a compact module assembly that allows for a smaller chassis form factor.

Disadvantages with state of the art z-axis circuit board configurations is that unacceptably large interconnect distances remain between the daughter card and the processor, particularly for memory daughter cards. The physical limitation of placement of the z-axis connector, which attaches the daughter card to the processor board, with respect to the newer, larger processors, causes these large interconnect distances. Improved apparatus, methods and configurations are needed which provide for smaller interconnect distances between z-axis memory daughter cards and the processor.

Horizontally stacked daughter cards utilizing z-axis interboard connectors require an improved method and apparatus for daughter card support. In some cases, the daughter cards are not in proximity to the computer rack or chassis to which it could be anchored. Further, edge anchoring would not support the central portion of a large daughter card, or a daughter card having relatively heavy electronic components attached. Further, the z-axis interboard connector may not be suitable for carrying the stresses needed to support the daughter card.

Standoff mounts are used with varying success. Standoff mounts are devices which support and maintain a separation between two printed circuit boards or between the printed circuit board and the computer chassis. State of the art standoffs include those that are made for a chassis to PCB installation or are modifications of chassis-type standoffs used for interboard applications. Additionally, state of the art standoffs commonly contain many parts and are difficult to use in the confined spaces of the chassis of the computer. Part of the difficulty in using standoffs is alignment of the board mounting hole with the standoffs.

There exists a need for improved standoff apparatus, methods and configurations that are optimized for horizontally disposed, z-axis interconnected PCBs. Such an improved standoff will properly support the attached boards, facilitate alignment of the boards during assembly, not put undue stress on the boards, and provide for simple manufacturing.

For the reasons stated above, and for other reasons which will become apparent to those skilled in the art upon reading and understanding the present specification, there is a need in the art for improved methods and apparatus to address the disadvantages of large interconnect distances between z-axis mounted electrical components and the processor, and improved printed circuit board standoff methods and apparatus that are optimized for horizontally disposed, z-axis interconnected PCBs.

SUMMARY

The above-mentioned disadvantages associated with large processors mounted on printed circuit boards and associated disadvantages of placing memory in close proximity to the processors, and other disadvantages, are addressed by the present invention and will be understood by reading and studying the following specification.

New apparatus, methods and configurations are provided that allows for a large memory capacity, as well as minimized interconnect distances between the memory chips and the one or more processors. The configuration and methods include placing the processors on one side of the processor board and the z-axis connector for the memory daughter cards placed on the opposite side of the processor board and in close proximity to the processor electrical leads. This enables the interconnection distance between the processor leads and memory daughter card leads to be minimized and not restricted by the physical size of the processor and z-axis connector housings.

In particular, an illustrative embodiment of the present invention includes a printed circuit board (PCB) having a plurality of apertures piercing through the PCB, wherein electrical leads of electrical components may pass through and be soldered. The PCB has a top surface and a bottom surface. The pattern of apertures on either side is substantially the same as the apertures pierce through the PCB. A plurality of groupings of apertures corresponding to the electrical lead patterns of larger electronic components are provided. Specifically, two HUB-chip conductive portions are provided, each HUB-chip conductive portion adapted to receive a HUB-chip. Additionally, four processor-chip conductive portions are provided. Each processor-chip conductive portion is adapted to receive a processor-chip. Two processor-chip conductive portions are disposed on opposite sides of each HUB-chip conductive portion in a symmetrical, mirror image arrangement. Eight z-axis connector conductive portions are provided, each z-axis connector conductive portion adapted to receive a z-axis connector. The z-axis connector conductive portion, the HUB conductive portion and the processor conductive portion are in close proximity to each other, minimizing the interconnect distance between the associated components.

Two HUB-chips, eight z-axis connectors, and various other electronic and mechanical components are attached to one side of the PCB. Four processor assemblies are attached to the converse side of the PCB. This configuration allows for the attachment of z-axis memory daughter cards to the z-axis connectors while retaining a minimum interconnect distance between the memory cards and the HUB.

DETAILED DESCRIPTION

The following detailed description refers to the accompanying drawings which form a part of the specification. The drawings show, and the detailed description describes, by way of illustration, specific illustrative embodiments in which the invention may be practiced. These embodiments are described in sufficient detail to enable those skilled in the art to practice the invention. Other embodiments may be used and mechanical changes may be made without departing from the scope of the present invention. The following detailed description is, therefore, not to be taken in a limiting sense. Like reference numbers refer to similar items in all the figures.

Figure 1:
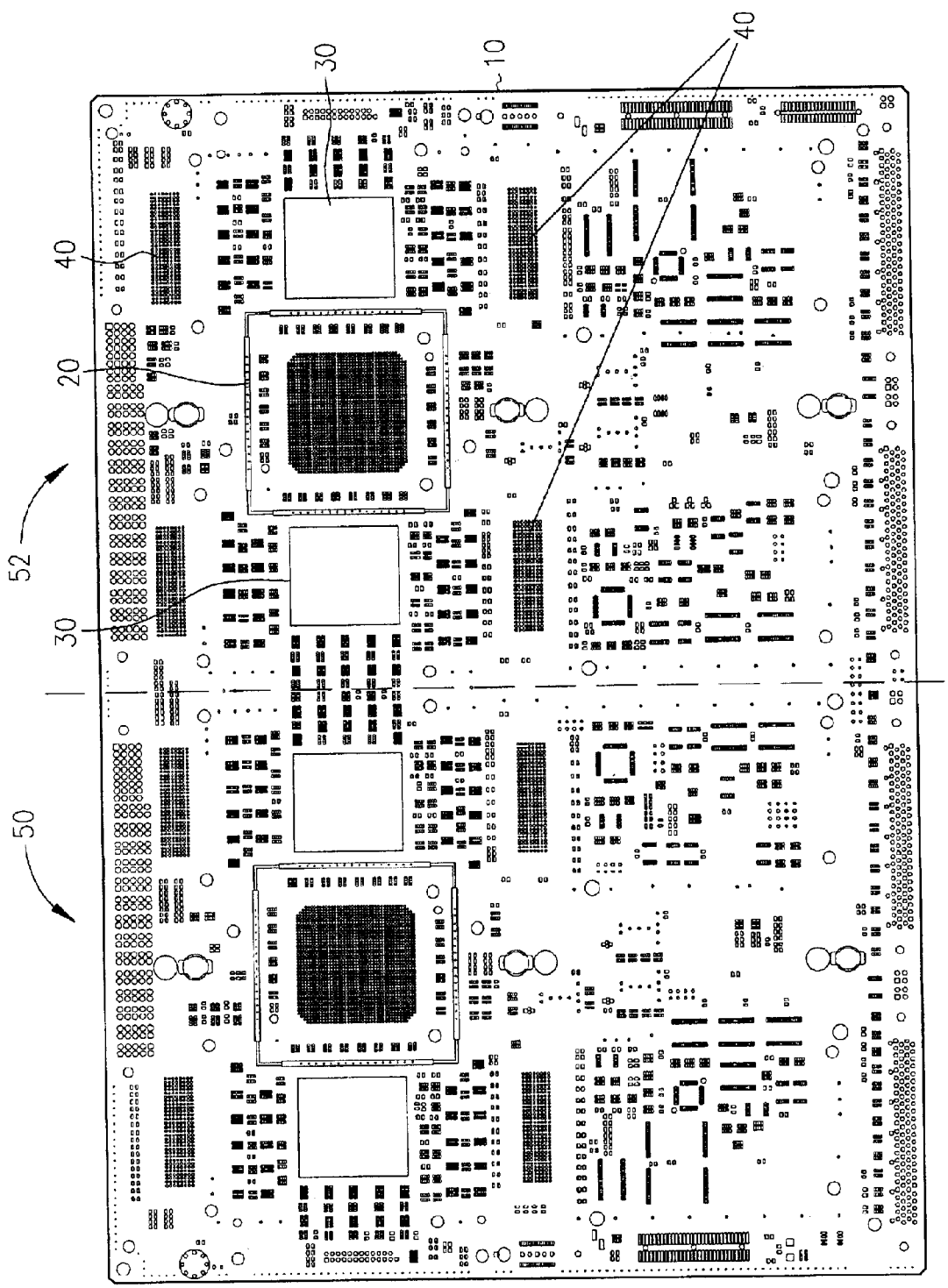
FIG. 1 illustrates a printed circuit board in accordance with one embodiment of the invention.

FIG. 1 depicts a printed circuit board (PCB) 10 in accordance with one embodiment of the present invention. Printed circuit board 10 is a multi layer flat, plate-like structure having external dimensions adapted to support attached electrical component or components, which will be described subsequently. Visible in the illustration is a plurality of apertures piercing through PCB 10 through which electrical leads of electrical components may pass. The apertures have an electrically conductive property such that electrical connections between the leads of electronic components can communicate with the conductive paths in and on PCB 10. The electrical leads of most electronic components are soldered to PCB 10 from the opposite of PCB 10.

In the embodiment of FIG. 1, PCB 10 has a top surface and a bottom surface. The pattern of apertures on either side is substantially the same as the apertures pierce through PCB 10. A plurality of groupings of apertures is visible in FIG. 1 corresponding to the electrical lead patterns of larger electronic components. Two HUB-chip conductive portions 20 are provided. Each HUB-chip conductive portion 20 is adapted to receive a HUB-chip set. Four processor-chip conductive portions 30 are provided. Each processor-chip conductive portion 30 is adapted to receive a processor-chip. Two processor-chip conductive portions 30 are disposed on either side of HUB-chip conductive portion in a symmetrical mirror arrangement. Eight z-axis connector conductive portions 40 are provided. Each z-axis connector conductive portion 40 is adapted to receive a z-axis connector. Z-axis connector conductive portion 40, HUB-chip conductive portion 20, and processor-chip conductive portion 30 are in close proximity to each other, minimizing the interconnect distance between the associated components.

Figure 2:
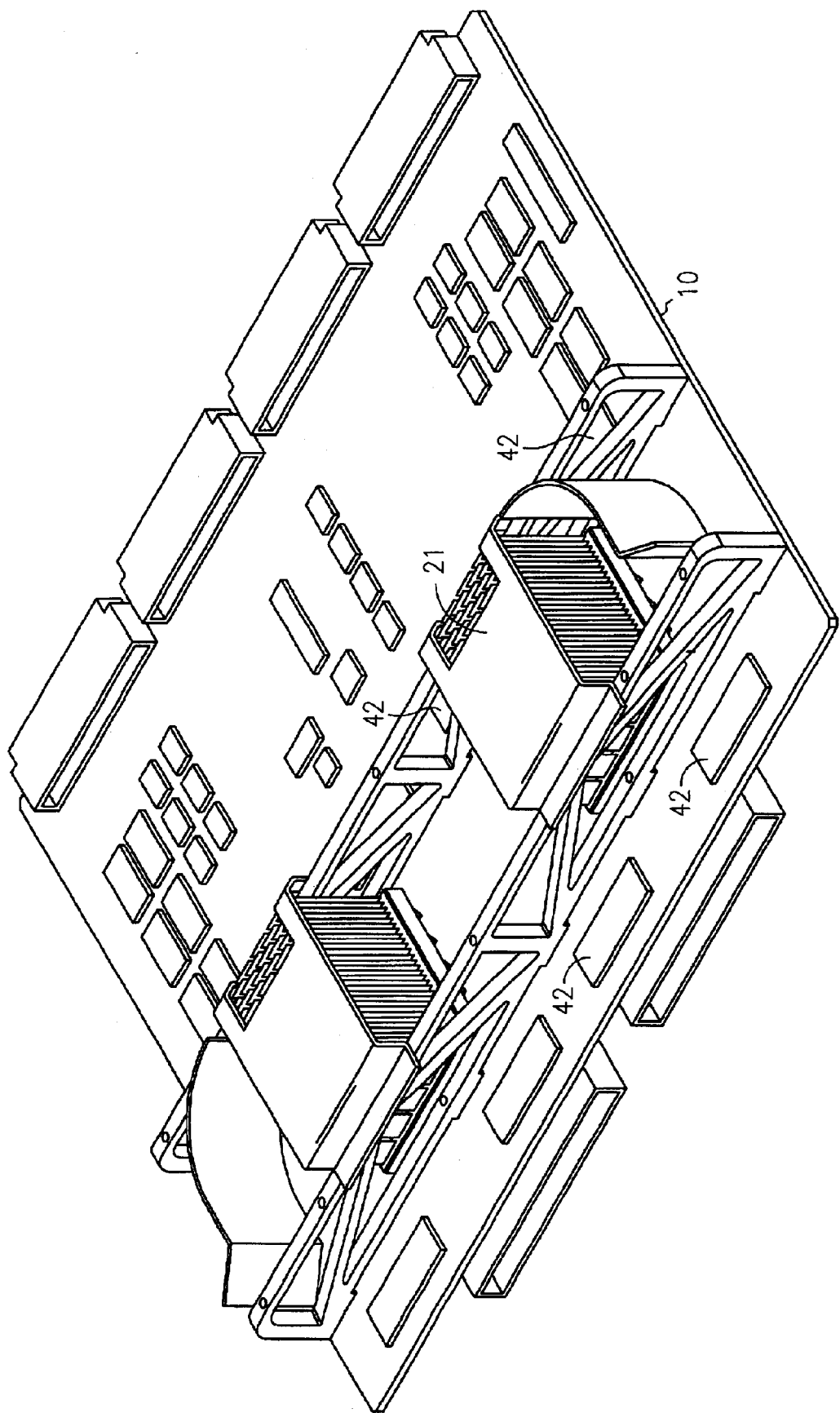
FIG. 2 illustrates a top view of a printed circuit board with attached electronic components in accordance with the embodiment of FIG. 1.
Figure 3:
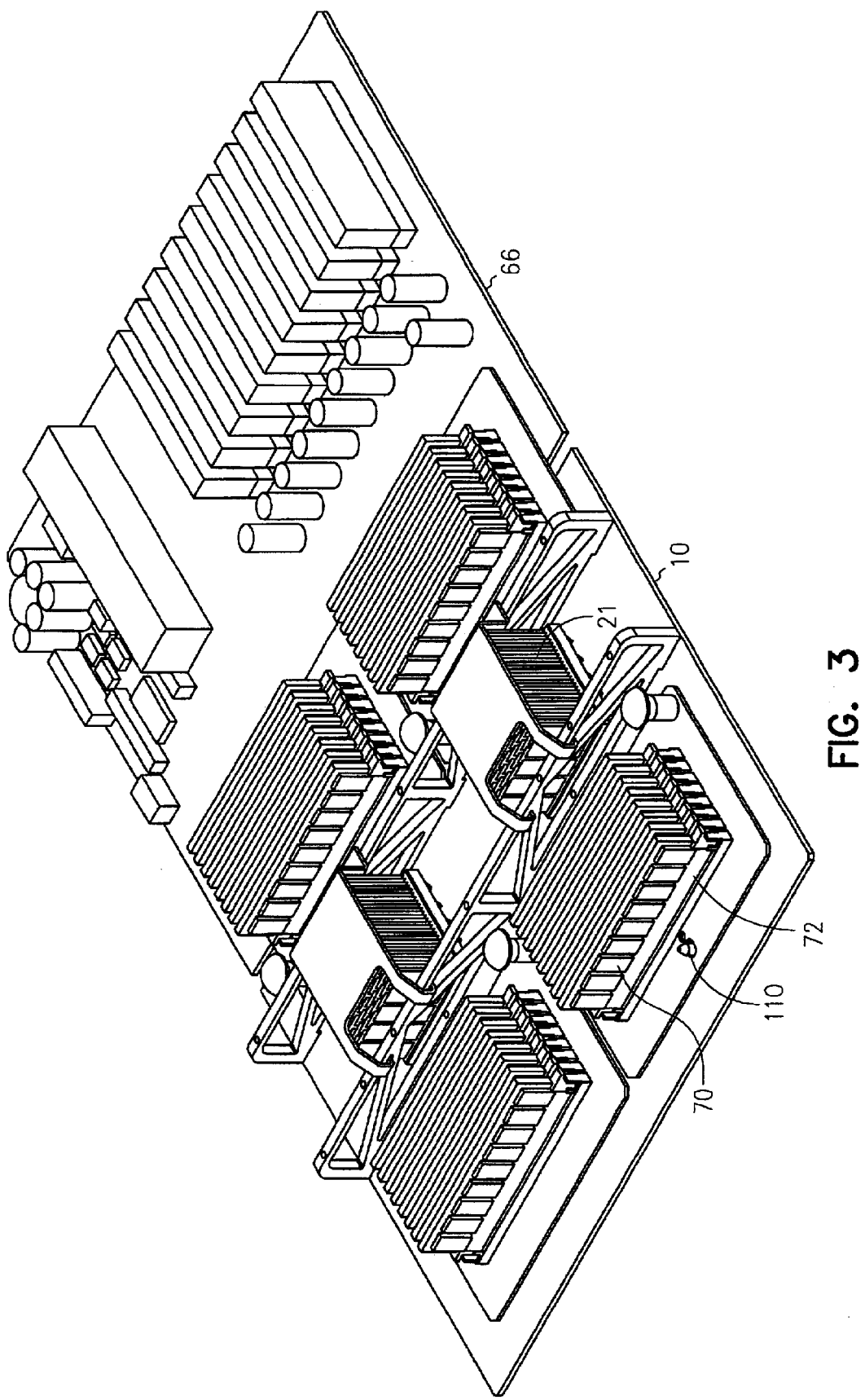
FIG. 3 illustrates a top view of a printed circuit board with attached electronic components in accordance with the embodiment of FIG. 1.
Figure 4:
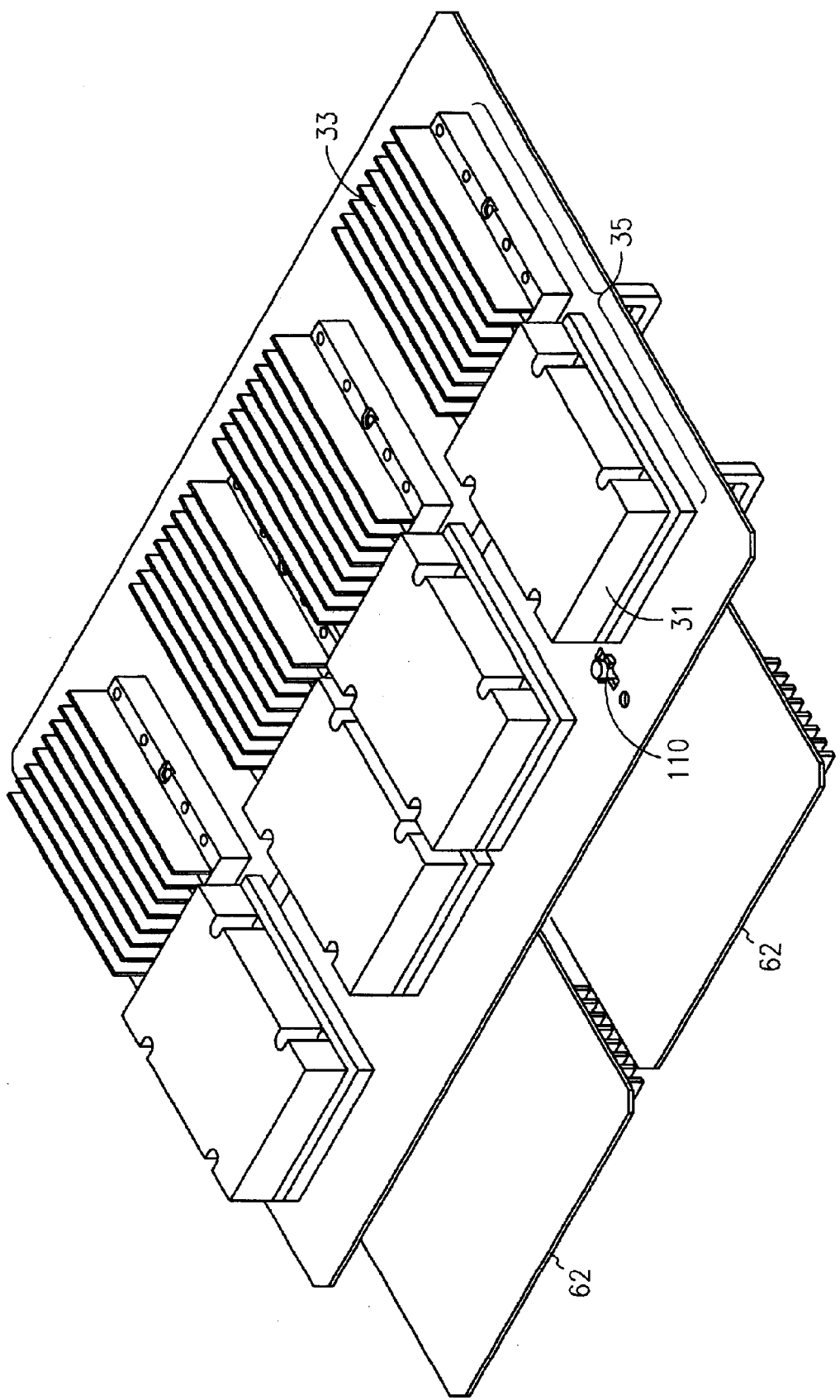
FIG. 4 illustrates a bottom view of a printed circuit board with attached electronic components in accordance with the embodiment of FIG. 1.

FIGS. 2, 3 and 4 illustrate a processor board populated with electronic components, in accordance with the embodiment of FIG. 1. FIG. 2 is a top view of PCB 10. Visible in the illustration are two attached HUB-chips 21, eight z-axis connectors 42, and various other electronic and mechanical components.

FIG. 3 is a top view of PCB 10, in accordance with the embodiment of FIG. 2. Visible in the illustration are four z-axis memory daughter cards 62. Each z-axis memory daughter card 62 has a top surface which includes a plurality of DIMM memory cards 70 and corresponding DIMM sockets 72. DIMM memory cards 70 are removably coupled to DIMM sockets 72. Each z-axis memory daughter card 62 has a bottom surface which includes one or more z-axis mating connectors (not shown) that provides interconnection with z-axis connector 42 attached to PCB 10, as shown in FIG. 2. In the embodiment of FIG. 3, each z-axis daughter card includes two z-axis mating connectors which are coupled with two corresponding z-axis connectors 42 attached to PCB 10.

In the embodiment of FIG. 3, PCB 10 contains two HUB-chips 21 and four z-axis memory daughter cards 62. It is understood that other embodiments of the present invention may have more or less HUB-chips 21 and z-axis memory daughter cards 62. In one embodiment, a processor board will be one-half the size of the embodiment of PCB 10 in FIG. 3, and will include one HUB-chip 21 and two z-axis memory daughter cards 62.

Also illustrated in FIG. 3 is a power board 66 attached to processor board 10. Power board 66 is not the subject of this invention, but is illustrated to illustrate the position of z-axis memory daughter cards 62 in relation to other computer components.

One or more standoffs 110 are used to support each of z-axis memory daughter cards 62 in spaced apart relationship with PCB 10. Standoffs 110 will be discussed subsequently.

FIG. 4 is a bottom view of PCB 10, in accordance with the embodiment of FIG. 2. Visible in the illustration are four processor assemblies 35. Each processor assembly consists of a processor chip 31 and a power conditioning module 33. The placement of processor assembly 35 on the bottom side of PCB 10, and the placement of HUB-chips 21 and z-axis memory daughter cards 62 on the top side of PCB 10 allows for an efficient packaging of the electronic components on PCB 10. The close proximity of HUB-chip conductive portions 20, z-axis connector conductive portions 40, and processor-chip conductive portions 30 allow for a very short interconnect distance for HUB-chip 21 and processor chips 31 to communicate with z-axis memory daughter cards 62. This close proximity would not be possible if HUB-chip 21 and processor assembly 35 were positioned on the same side of PCB 10 due to the physical external dimensions of the components.

In operation, each HUB-chip 21 communicates with each of two adjacent z-axis memory daughter cards 62 through two z-axis connectors 42.

In the illustrated embodiments of FIGS. 1, 2 and 3, processor board 10 is a modified McKinley (Intel Corporation, Santa Clara, Calif.) protocol processor board. It can be seen in FIG. 4 that four processor assemblies 35, which are McKinley processor assemblies, are coupled to bottom side of PCB 10. Because of the physical size of processor assemblies 35, undesirably long distances between processor chips 31, HUB-chip 21, and z-axis memory daughter cards 62 would result if Z-axis memory daughter cards 62 were connected to the same side of PCB 10 as processor chips 31. As illustrated in FIGS. 2 and 3, two HUB-chips 21, z-axis memory daughter cards 62, and other components are attached to top surface of PCB 10. Sufficient space on PCB 10 is provided for attaching z-axis connectors 42 in very close proximity to processor chips 31.

Figure 5:
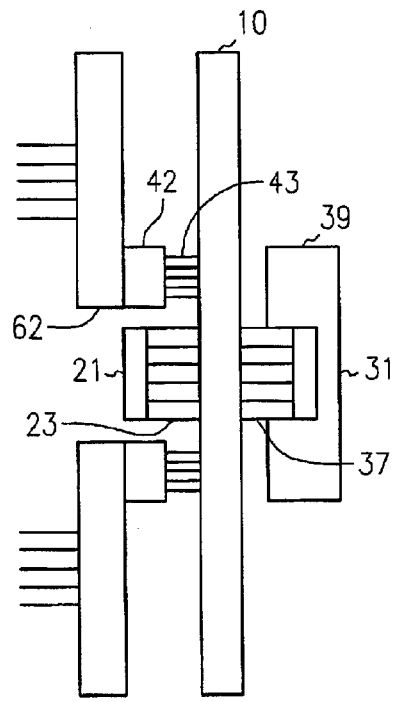
FIG. 5 illustrates a side view of a printed circuit board with attached electronic components in accordance with one embodiment of the present invention.

Illustrated in FIG. 5 is a side-view, in accordance with one embodiment of the invention, of PCB 10, processor chips 31 with processor connecting leads 37, HUB-chip 21 with HUB-chip connecting leads 23, and z-axis memory daughter card 62 with z-axis connector 42 and z-axis connector connecting leads 43. Processor chips 31 include a processor body 39. It can be seen that the width of processor body 39 is larger than the width of processor connecting leads 37. In an embodiment of the present invention, locating processor chips 31 on the opposite side of PCB 10 as z-axis memory daughter card 62, enables z-axis connector connecting leads 43 and processor connecting leads 37 to be in close proximity to each other. This configuration provides for a very short interconnect distance between z-axis memory daughter card 62 and processor chips 31, and correspondingly provides for improved performance for the computer system.

Figure 6:
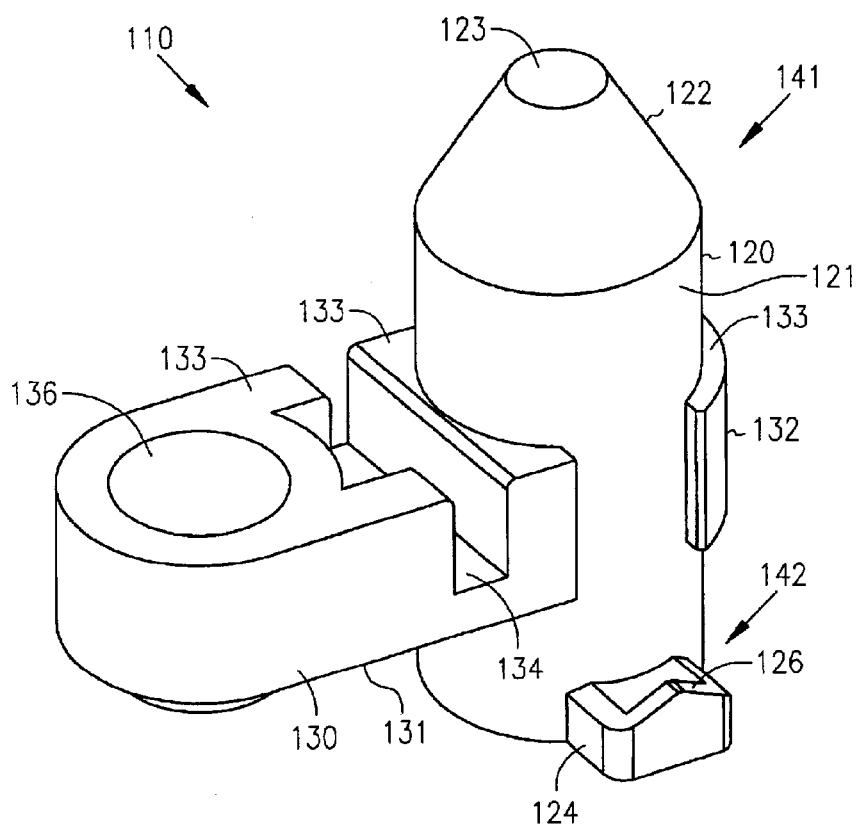
FIG. 6 illustrates a standoff in accordance with one embodiment of the present invention.

FIG. 6 depicts standoff 110 in accordance with one embodiment of the invention. Standoff 110 includes alignment pin portion 120 and spacer portion 130. Alignment pin portion 120 includes alignment portion 122, foot 124, and urging portion 126. Spacer portion 130 includes pin support 132, relief portion 134, and aperture 136.

Alignment pin portion 120 includes a cylindrical portion 121 having a first end 141 and a second end 142. The diameter of cylindrical portion 121 is adapted to pass through an alignment aperture in a printed circuit board, which will be described subsequently. First end 141 of cylindrical portion 121 terminates as a truncated cone alignment portion 122. Alignment portion 122 is adapted to urge proper alignment and ease assembly of alignment pin 120 with an attached PCB. Second end 142 of cylindrical portion 121 includes two feet 124 which project outwardly and oppositely from second end 142 of cylindrical portion 121. Feet 124 are adapted to fit through slots in a first PCB, as will be described subsequently. Each foot 124 includes an urging portion 126 which is adapted to establish a secure capture of a first PCB between foot 124 and spacer portion 130, which will be described subsequently.

Alignment pin portion 120 is adapted to have sufficient height for proper attachment to two PCB's, such that alignment portion 122 sufficiently projects from an alignment aperture in an attached PCB, and that feet 124 and spacer portion 130 sufficiently capture the bottom surface of a first PCB.

Spacer portion 130 includes pin support 132 and aperture 136. Spacer portion 130 further includes a top surface 133 and a bottom surface 131. Top surface 133 and bottom surface 131 are substantially flat and parallel to each other. Pin support 132 is adapted to aid in the support of an attached PCB. Aperture 136 is adapted to provide access for a fastening means, such as, among others, bolts and screws.

The spaced apart relationship between urging portion 126 and bottom surface 131 is adapted to provide a snug capture of a first PCB placed therebetween.

Spacer portion 130 is adapted to have a height, defined as the distance between top surface 133 and bottom surface 131, such as to provide sufficient separation between two attached PCBs, as will be described subsequently. Further, spacer portion 130 will have sufficient surface area to sufficiently support the attached PCBs, without interfering with attached components on the PCBs.

Standoff 110 may be manufactured as an integral unit. Standoff 110 may be manufactured by, among other methods, injection molding and casting. Standoff 110 may comprise any suitable material, among others, plastic and metal.

Figure 7:
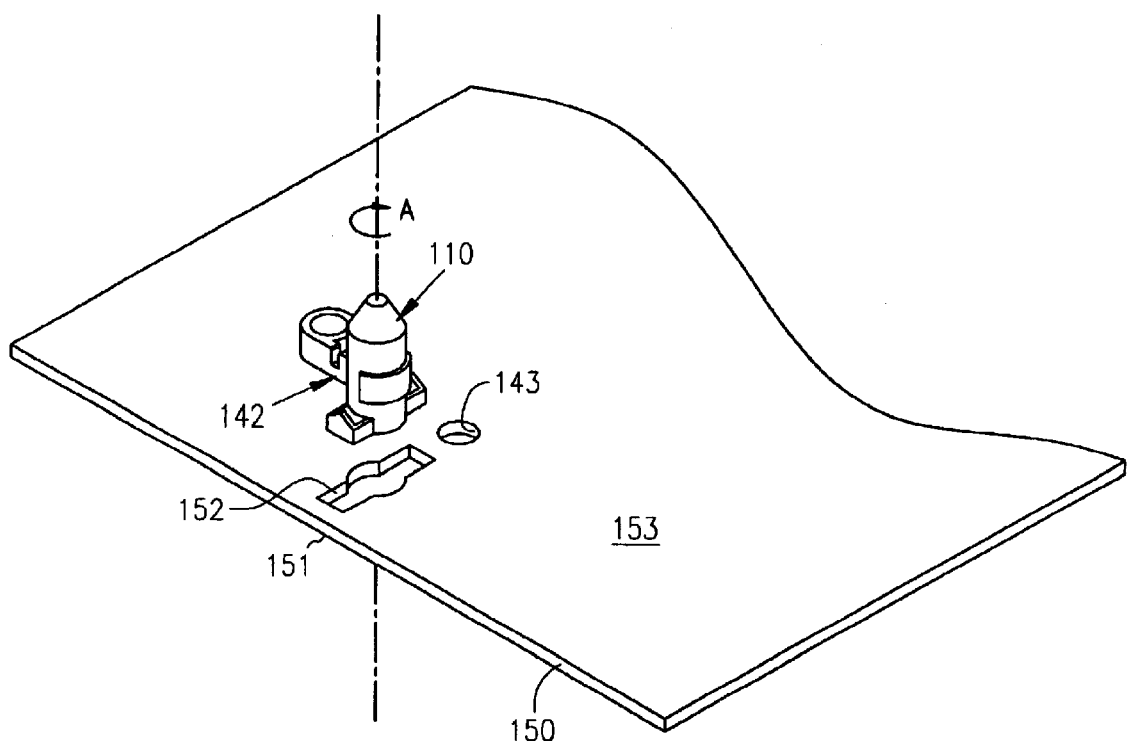
FIG. 7 illustrates an exploded view of a standoff and a first printed circuit board, in accordance with one embodiment of the present invention.

Illustrated in FIG. 7 is an exploded view of an embodiment of PCB 150 and standoff 110, in accordance with an embodiment of the present invention. PCB 150 includes an aperture 152 adapted to receive second end 142 of standoff 110. PCB 150 further includes a PCB bottom surface 151 and a PCB top surface 153. Second end 142 is inserted into aperture 152, and standoff 110 is rotated 90 degrees to engage urging portion 126 against PCB bottom surface 151 while simultaneously urging spacer portion bottom surface 131 against PCB top surface 153, essentially removably locking standoff 110 onto PCB 150.

Figure 8:
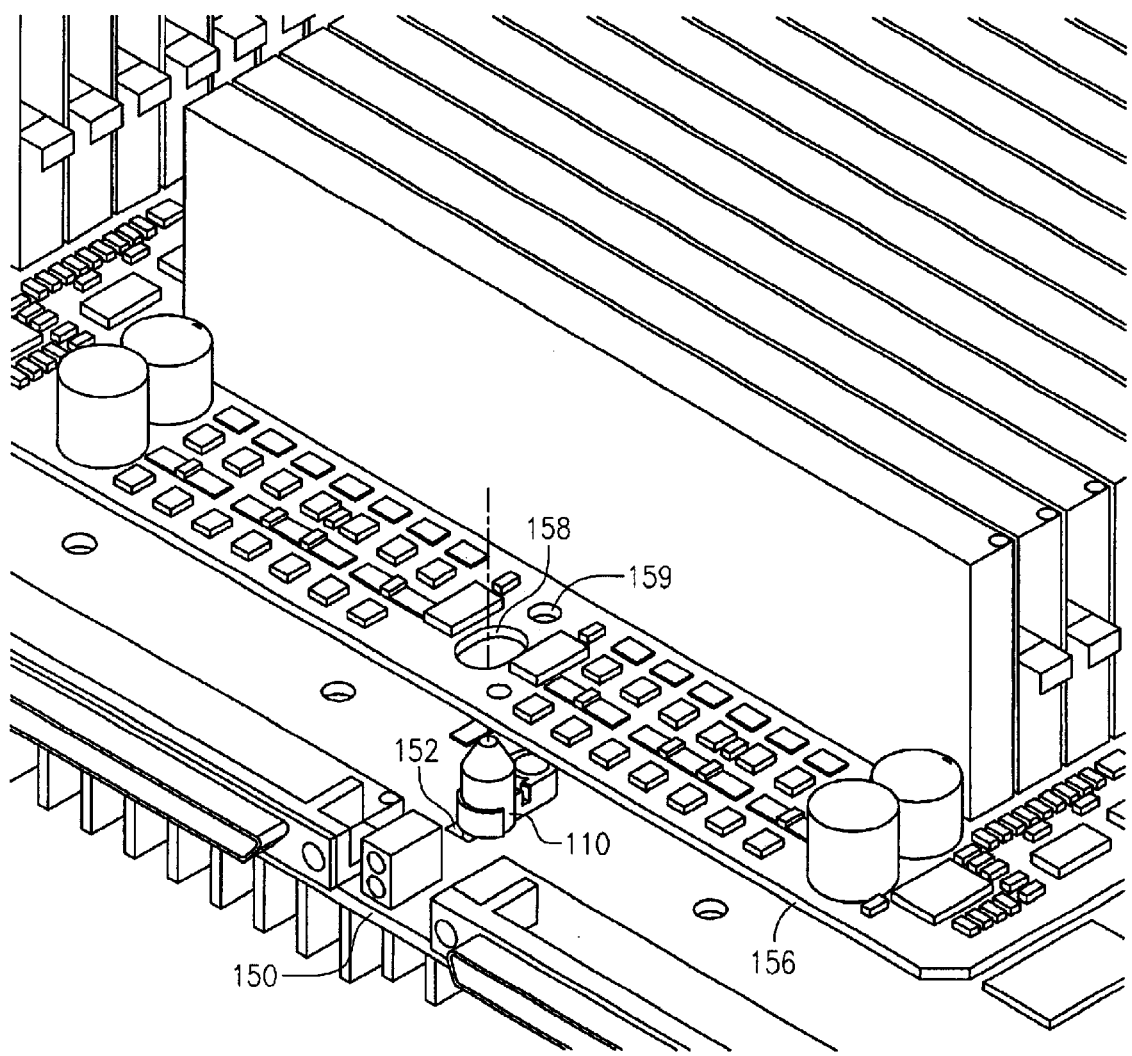
FIG. 8 illustrates an exploded view of the application of the standoff and a second printed circuit board, in accordance with the embodiment of FIG. 7.

Illustrated in FIG. 8 is an exploded view of PCB 150 assembled to standoff 110 with second PCB 156. Second PCB 156 includes an alignment aperture 158 and fastening aperture 159. Second PCB 156 is lowered onto standoff 110 such that alignment portion 122 passes through alignment aperture 158.

Figure 9:
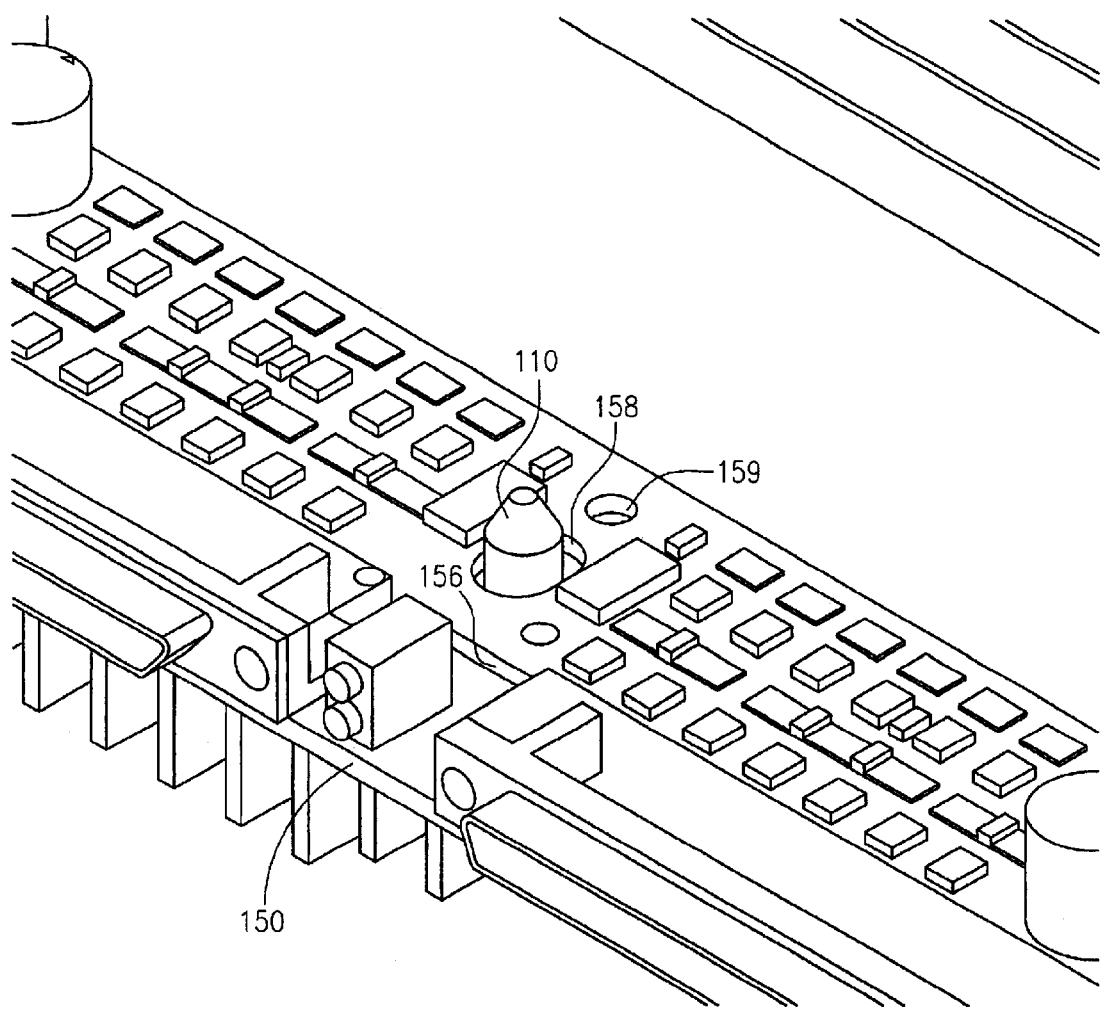
FIG. 9 illustrates an assembly of a first and second printed circuit board an the standoff, in accordance with the embodiment of FIG. 7.

Illustrated in FIG. 9 is a view, in accordance with the embodiment of FIG. 8, of an assembly consisting of first PCB 150, second PCB 156, and standoff 110. Once second PCB 156 is assembled onto standoff 110, fastening aperture 159 will be coaxial with aperture 136 of spacer portion 130. Fastening means is used to secure second PCB 156 with standoff 110. Fastening means includes, among others, screws and bolts. In another embodiment, a coaxial relationship is established with fastener aperture 159, aperture 136, and an aperture 143 (shown in FIG. 7) in first PCB 150, and a fastening portion of a second standoff. Fastening means is used to secure second PCB 156 with PCB 150.

Referring back to the embodiment of FIG. 3, standoff 110, in accordance with an embodiment of the method of the invention, is used to support and secure z-axis memory daughter card 62 with PCB 10. In the embodiment as shown, two standoffs 110 are used to support and secure one z-axis memory daughter card 62.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention.

What is claimed is:

1. A circuit board attachment device, comprising:

a spacer;

an attachment aperture coupled to the spacer, and an alignment guide coupled to the spacer, the alignment guide adapted to align a pair of parallel circuit boards with the attachment aperture wherein the attachment aperture is laterally spaced apart from the alignment guide.

2. The circuit board attachment device of claim 1, wherein the alignment guide includes a truncated cone portion.

3. The circuit board attachment device of claim 1, further including an urging mechanism, the urging mechanism adapted to hold the circuit board attachment device in place on at least one of the parallel circuit boards prior to attachment using the attachment aperture.

4. The circuit board attachment device of claim 3, wherein the urging mechanism includes at least one ramped portion that is adapted to wedge against at least one of the pair of parallel circuit boards.

5. The circuit board attachment device of claim 1, wherein the circuit board attachment device is integrally formed from a single material.

6. The circuit board attachment device of claim 3, wherein the single material includes a polymeric material.

7. A circuit board assembly comprising:

a first circuit board;

a controller chip set located on a first surface of the first circuit board;

a second circuit board, having a plurality of memory modules disposed thereon; and an attachment device between the first circuit board and the second circuit board, including:

a spacer;

an attachment aperture coupled to the spacer; and an alignment guide coupled to the spacer, the alignment guide adapted to align the first circuit board and the second circuit board with the attachment aperture wherein the attachment aperture is laterally spaced apart from the alignment guide.

8. The circuit board assembly of claim 7, wherein the attachment device is fabricated from a polymeric material.

9. The circuit board assembly of claim 7, further including a fastener adapted to interface with the aperture to secure the second circuit board to the first circuit board.

10. The circuit board assembly of claim 9, wherein the fastener includes a screw.

* * * * *

UNITED STATES PATENT AND TRADEMARK OFFICE
CERTIFICATE OF CORRECTION

PATENT NO. : 6,726,505 B2
DATED : April 27, 2004
INVENTOR(S) : Cermak, III et al.

It is certified that error appears in the above-identified patent and that said Letters Patent is hereby corrected as shown below:

Column 8,
Line 22, delete "," and insert -- ; -- , therefor.
Line 33, insert -- pair of -- before "parallel".

Signed and Sealed this

Thirtieth Day of November, 2004

JON W. DUDAS
*Director of the United States Patent and Trademark Office*